United States Patent [19]
Akdag

[11] Patent Number: 5,986,869
[45] Date of Patent: Nov. 16, 1999

[54] GROUNDING PANEL

[75] Inventor: Omer Akdag, Sparks, Nev.

[73] Assignee: PolyPhaser Corporation, Minden, Nev.

[21] Appl. No.: 09/019,350

[22] Filed: Feb. 5, 1998

[51] Int. Cl.$^6$ ........................................ H02H 1/00
[52] U.S. Cl. ........................... 361/119; 361/111; 361/115; 361/118
[58] Field of Search .................................. 361/1, 115, 58, 361/42, 56, 91, 111, 118, 119, 127

[56] References Cited

U.S. PATENT DOCUMENTS 3,783,178   1/1974   Philibert .................................. 174/86

Primary Examiner—Stephen W Jackson
Attorney, Agent, or Firm—Sheppard, Mullin, Richter & Hampton LLP; Ketan S. Vakil

[57] ABSTRACT

Apparatus and method for protecting hardware devices using a grounding panel. The grounding panel provides a low inductance path to ground. The grounding panel includes first and second telescoping tubes each having inner and outer ends and the first tube having an outer surface and the second tube having an inner surface. The inner end of the first tube is slidably housed within the inner end of the second tube. A portion of the inner end of the first tube is radially outwardly deflectable. A means for biasing the portion outwardly such that the outer surface of the first tube is biased against the inner surface of the second tube so to maintain electrical and mechanical contact between the first and second tubes over a range of relative telescopic positions of the first and second tubes.

21 Claims, 5 Drawing Sheets

GROUNDING PANEL

BACKGROUND OF THE INVENTION

The present invention relates to a grounding panel and more particularly to a grounding panel having a variable length connector assembly that grounds electrical charges that are received and transmitted through a cable to electrical components and communications equipment.

FIG. 1 illustrates a prior art system. In one prior art system, two separate copper plates 112, 114 would be fixed to a shelter wall 192, one plate 114 being attached to the inside of the shelter wall 192 and one plate 112 being attached to the outside of the shelter wall 192. A transmission line 130 is then positioned through the shelter wall 192. Each plate 112, 114 requires an independent set of wires, switches, and connections to ground 170. Transmission line 130 is connected to plates 112, 114 using wires 116. A surge suppressor 100 may be placed along the transmission line 130 and connected to wires 116. Wires 118 are used to connect plates 112, 114 to ground 170. The transmission line 130 utilizes one set of wires for the connections to plate 112 and another set of wires for the connections to plate 114. Also, the wire lengths must be customized for a range of wall thicknesses. In addition, each plate 112, 114 must be separately installed and aligned on the shelter wall 192. Separate installation and alignment of each plate requires additional time and resources resulting in inefficiencies. Also grounding wire 118 causes high impedance reducing effectiveness of the grounding plates 112, 114.

Additional costs and maintenance expenses are incurred when using additional wires, switches, and connections. Furthermore, reliability is reduced when the amount of wires, switches, and connections are increased.

Ideally, what is needed is a grounding panel having a variable length connector assembly that bonds inside and outside panels with a low impedance electrical connection.

SUMMARY OF THE INVENTION

The present invention relates to a grounding panel for dissipating electrical surges from a transmission line or hardware equipment such as auxiliary equipment, computers, and communications equipment. The grounding panel protects hardware equipment from electrical surges by discharging the electrical energy through a grounding panel and a grounding plate. During normal operating conditions, a radio frequency signal is transmitted along a transmission line to the hardware equipment. During a surge condition, such as lightning, the electrical surge travels along both inner and outer conductors of the transmission line which are directly or indirectly coupled to the grounding panel. The electrical surge is then discharged to ground via the grounding panel and the grounding plate. The grounding panel preferably includes a connector assembly, a set of side plates, and a biasing system.

The connector assembly has first and second telescoping tubes each having inner and outer ends. The inner end of the first tube is slidably housed within the inner end of the second tube. The first tube has an outer surface and the second tube has an inner surface. The connector assembly is positioned between the set of side plates for maintaining conductivity from one side plate to the other side plate.

A portion of the inner end of the first tube is radially outwardly deflectable. A biasing system is used to deflect the portion outward. The outer surface of the first tube is biased against the inner surface of the second tube so to maintain electrical and mechanical contact between the first and second tubes over a range of relative telescopic positions of the first and second tubes. The biasing system includes a disk and an assembly pin. The disk is positioned in the portion of the inner end of the first tube. The assembly pin is connected to the disk and when torque is applied to the assembly pin, the assembly pin causes the disk to move the portion radially outward causing the first tube to make electrical and mechanical contact with the second tube. Therefore, as the first tube moves in and out of the second tube, the first tube continually maintains electrical and mechanical contact with the second tube due to the outward force placed on the inner end of the first tube.

Advantages of the invention include providing a variable length grounding panel for discharging an electrical surge to ground. Furthermore, the grounding panel provides a wall mounted, surge suppressor mounting facility having a low manufacturing cost. Additionally, the invention provides a design that allows the grounding panel to be positioned in walls having a range of thicknesses without any modification to the design.

A further understanding of the nature and advantages of the inventions herein may be realized by reference to the remaining portions of the specification and the attached drawings.

DETAILED DESCRIPTION OF SPECIFIC EMBODIMENTS

The present invention will now be described in reference to a preferred embodiment that operates as a grounding panel. In particular, examples will be described which illustrate particular features of the invention. The present invention, however, is not limited to any particular features nor limited by the examples described herein. Therefore, the description of the embodiments that follow are for purposes of illustration and not limitation.

Figure 2:
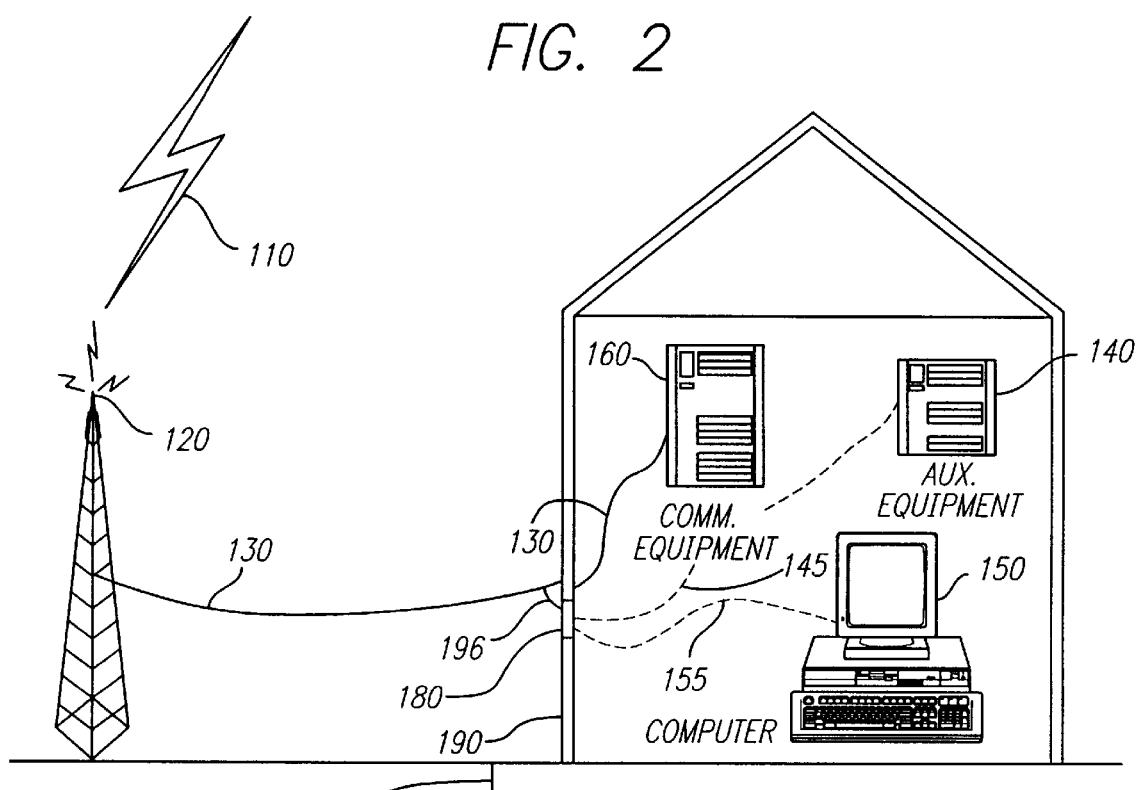
FIG. 2 illustrates the electrical connections and the physical placement of the grounding panel in a system according to the present invention.

FIG. 2 illustrates the electrical connections and the physical placement of the grounding panel in a system according to the present invention. A grounding panel 180 provides a low inductance or impedance ground path to hardware equipment, such as auxiliary equipment 140, computers 150, and communications equipment 160, from an electrical surge that can damage or destroy the hardware equipment. An electrical surge can arise in many different situations, however, typically arises when a lightning bolt 110 strikes a radio tower 120, a transmission line 130, or any other conducting surface that can receive or transmit an electrical charge. Lightning surges consist of DC electrical energy and AC electrical energy up to approximately 1 MHz.

In a preferred embodiment, transmission line 130 is coupled to radio tower 120 and grounding panel 180. Transmission line 130 may be a coaxial cable which transmits and receives radio frequency ("RF") signals during normal operation. Typically during a surge condition, the lightning bolt 110 strikes the radio tower 120 and the electrical surge travels along transmission line 130. Transmission line 130 carries the electrical surge to the grounding panel 180 which is coupled to a grounding plate 190. The electrical surge on the shield (outer conductor 130A) of the transmission line 130 then travels along the grounding plate 190. Grounding plate 190 provides a low impedance path to ground 170 thus diverting the electrical surge to ground 170 rather than allowing the surge to propagate to the hardware equipment. Additional surge protection equipment may be employed to ground surge energy on the center pin (inner conductor 130B) of the transmission line 130. The grounding panel 180 also provides a low inductance ground path for such surge protection equipment. Therefore, when the electrical surge reaches grounding panel 180, the electrical surge is discharged to ground 170 via grounding plate 190 without reaching the hardware equipment which it could ultimately damage or destroy.

In addition, the hardware equipment may be attached to single point grounding for surge protection. Therefore, auxiliary equipment 140 and computers 150 may be coupled to the grounding panel 180 using electrical grounding cables 145, 155, respectively. Grounding cables 145, 155 are conductive copper grounding wires. Communications equipment 160 is coupled to the grounding panel 180 using transmission line 130 which may be a coaxial cable or any other cable or device having an outer conductor and an inner conductor capable of transmitting and receiving RF signals. Typically, a grounding cable 196 is used to couple transmission line 130 to grounding panel 180.

Figure 1:
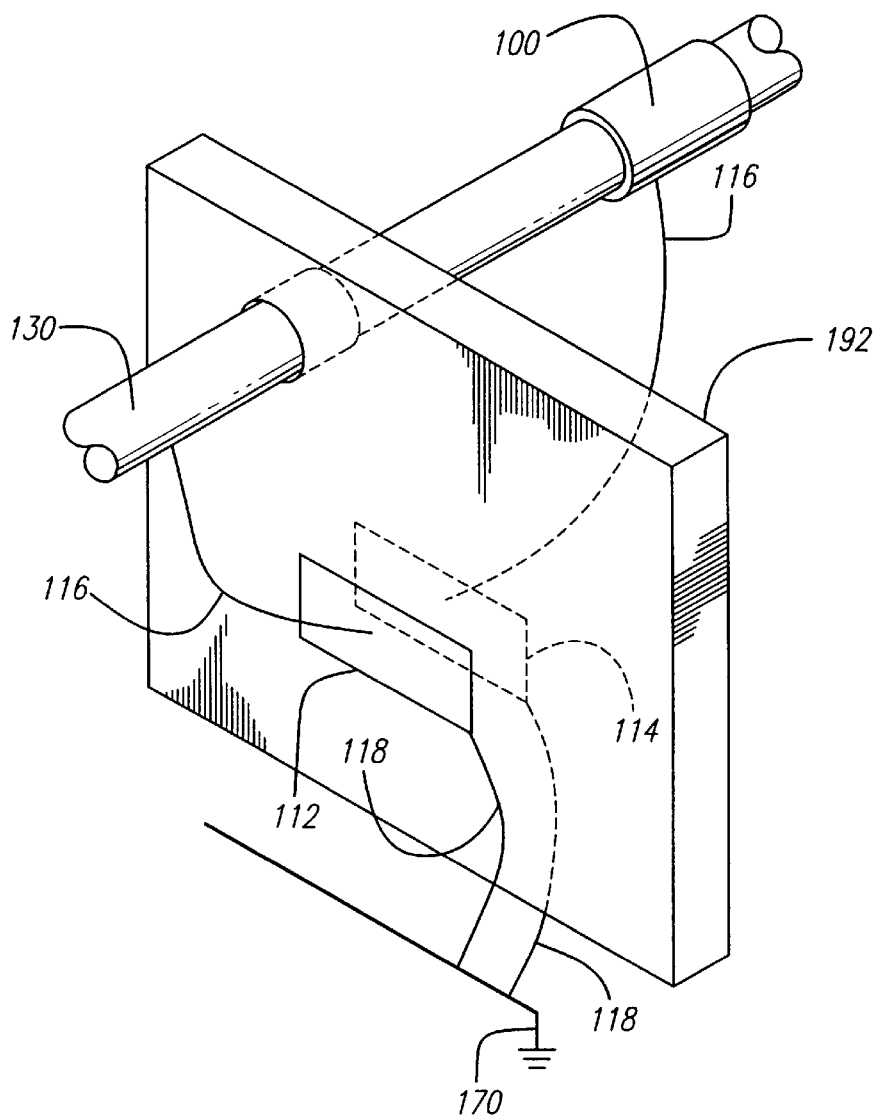
FIG. 1 illustrates a prior art system.
Figure 3:
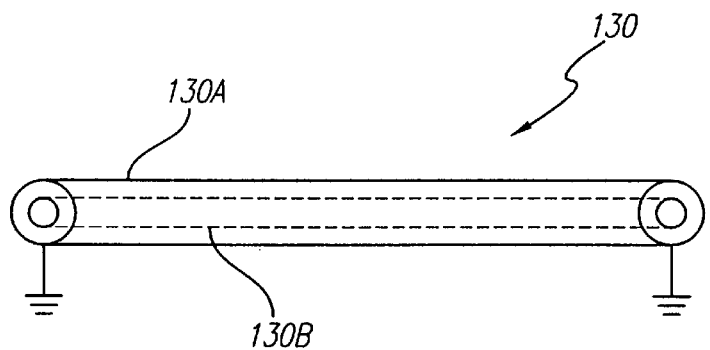
FIG. 3 illustrates a cross-sectional view of a transmission line for use with the present invention.

FIG. 3 illustrates a cross-sectional view of a transmission line for use with the present invention. Transmission line 130 has an outer conductor 130A and an inner conductor 130B. The outer conductor 130A has a low impedance path to ground thus enabling the electrical surge to travel along the outer conductor 130A. The RF signal travels along the inner conductor 130B which has a higher impedance path to ground, typically between 50 to 300 ohms. The outer conductor 130A is coupled to the grounding panel 180 using grounding cable 196. When the electrical surge reaches the grounding panel 180 via the outer conductor 130A, the electrical surge is discharged to ground 170 through grounding panel 180 and grounding plate 190.

Figure 4:
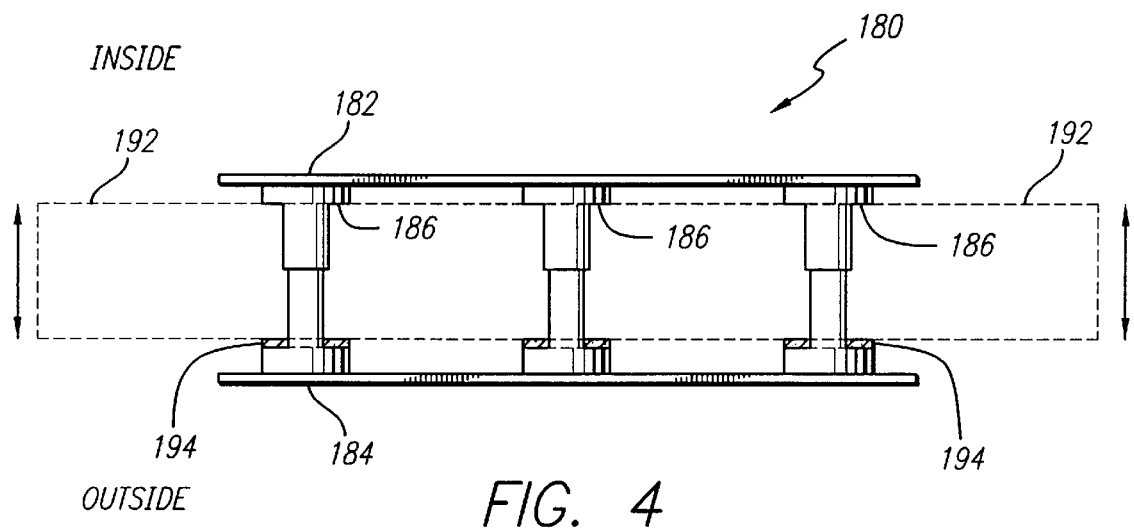
FIG. 4 illustrates a top view and the physical placement of the grounding panel of a preferred embodiment of the present invention.

FIG. 4 illustrates a top view and the physical placement of the grounding panel of a preferred embodiment of the present invention. Preferably, grounding panel 180 has side plates 182, 184 which are made of a conductive material such as copper. At least one connector assembly 186 is used to couple side plate 182 to side plate 184. Screws (not shown) are typically used to couple the connector assembly 186 to side plates 182, 184. Alternatively, bolts, rivets, welding or soldering can be used to couple the connector assembly 186 to side plates 182, 184.

The connector assembly 186 is a variable length structure used for varying the distance between side plate 182 and side plate 184 while continually maintaining conductivity between side plate 182 and side plate 184. Side plate 182 is positioned proximate to the inside of a wall 192 and side plate 184 is positioned proximate to the outside of the wall 192 (See also FIG. 2). A rubber sealer 194 is typically positioned concentric with connector assembly 186 to protect the wall 192 or the inside of a building from environmental conditions.

A variable length connector assembly 186 is preferred since the connector assembly 186 is typically positioned through a wall 192. The wall's 192 thickness can vary depending on the type of material and specifications used to build the wall 192. Hence, a variable length connector assembly 186 can be mass produced without prior knowledge of the wall's 192 thickness in which the connector assembly 186 is to be positioned. This allows for a more versatile grounding panel 180 that does not require custom fitting for each particular application.

Figure 5:
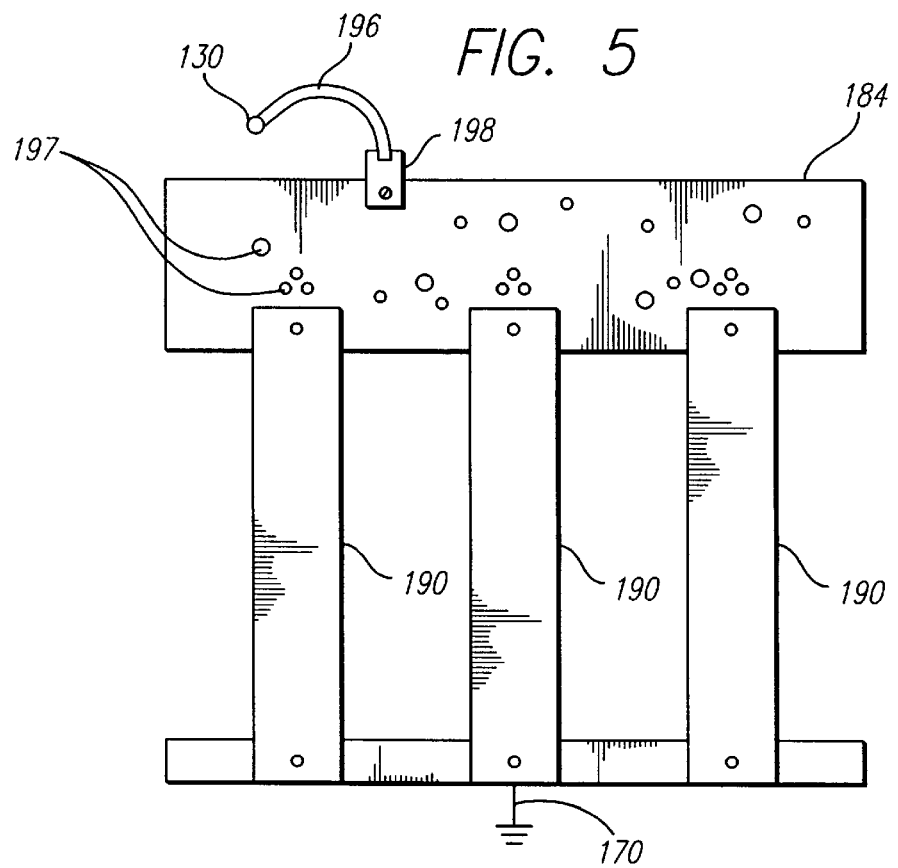
FIG. 5 illustrates a front view and the physical placement of the side plate of a preferred embodiment of the present invention.

FIG. 5 illustrates a front view and the physical placement of the side plate of a preferred embodiment of the present invention. Side plates 182, 184 have a number of holes 197 contained therein for coupling connector assembly 186 to the side plates 182, 184 (see also FIG. 6). Also, the holes 197 in the side plates 182, 184 are used to ground the outer conductor of transmission line 130 by means of grounding cable 196 or a strap assembly. Alternatively, a grounding cable 196 can be used to electrically couple transmission line 130 to a clamping device 198. Clamping device 198 may be used to couple grounding cable 196 to side plate 184.

By electrically coupling transmission line 130 to side plates 182, 184, an electrical surge can be discharged to ground 170 before reaching the hardware equipment. When an electrical surge travels along transmission line 130, it takes the path of lowest impedance which is along the outer conductor 130A. Hence, the electrical surge is discharged to ground 170 via grounding plate 190 when the surge reaches side plate 184. Furthermore, the ground terminals of auxiliary equipment 140 and computers 150 are coupled to side plate 182 using grounding cables 145, 155 to provide a discharge path to ground 170 in the event the hardware equipment experiences an electrical surge. By coupling connector assembly 186 to both side plates 182, 184, any surge condition that reaches the grounding panel 180 from either the transmission line 130 or hardware equipment will be discharged to ground 170.

Figure 6:
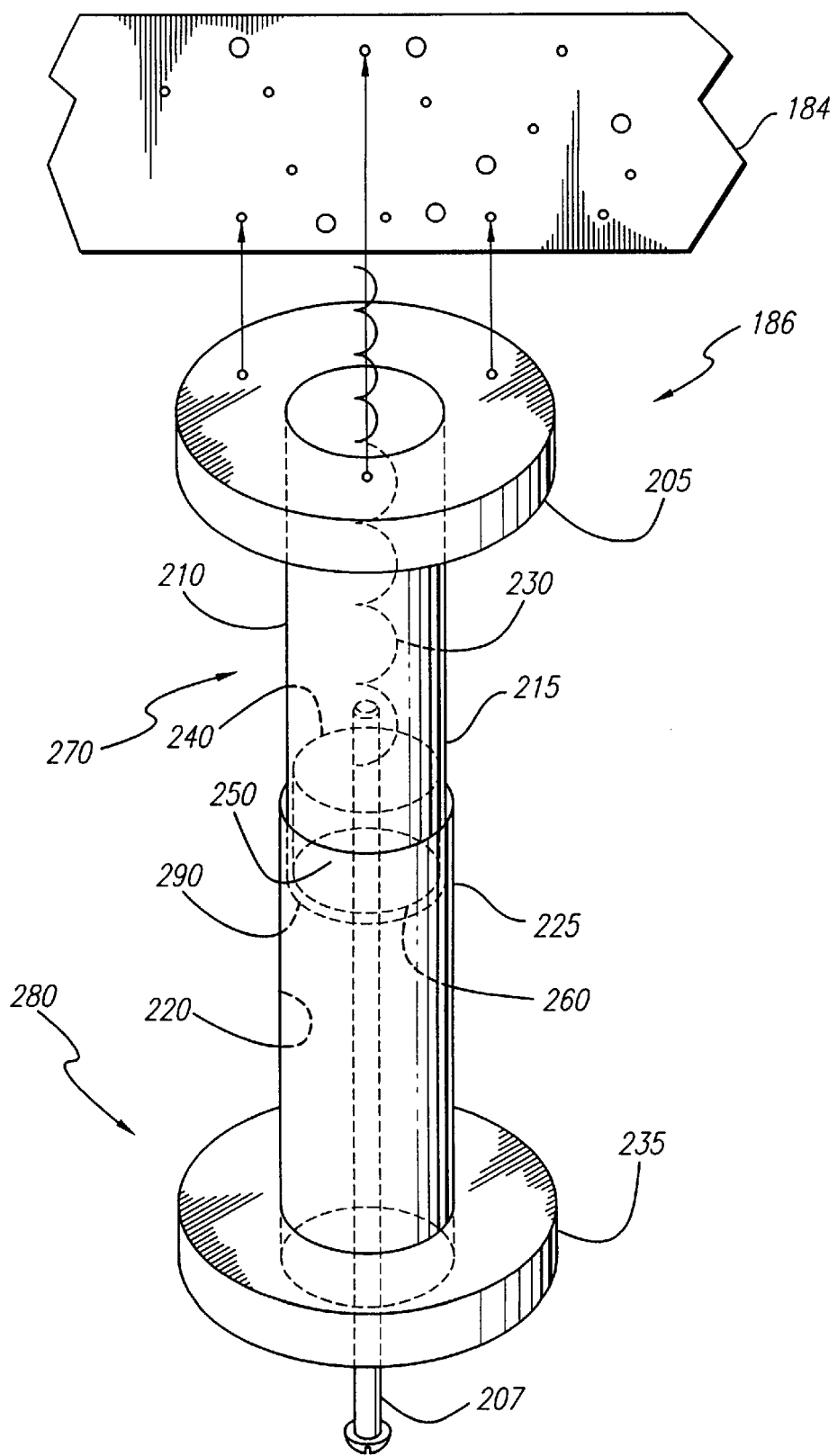
FIG. 6 illustrates a cross sectional view of the connector assembly and a front view of the side plate of a preferred embodiment of the present invention.

FIG. 6 illustrates a cross sectional view of the connector assembly and a front view of the side plate of a preferred embodiment of the present invention. Typically, connector assembly 186 includes a first tube 270 and a second tube 280. First tube 270 has an inner end 215 and an outer end 205. Second tube 280 has an inner end 225 and an outer end 235. The first tube 270 and the second tube 280 are made of a conductive material such as copper or its alloys. Typically, the tubes are telescoping, that is, one tube can fit inside the other. The inner end 215 of the first tube 270 can be slidably housed within the inner end 225 of the second tube 280. First tube 270 has an outer surface 210 and second tube 280 has an inner surface 220. First tube 270 and second tube 280 are hollow inside and are open on both ends.

Figure 7:
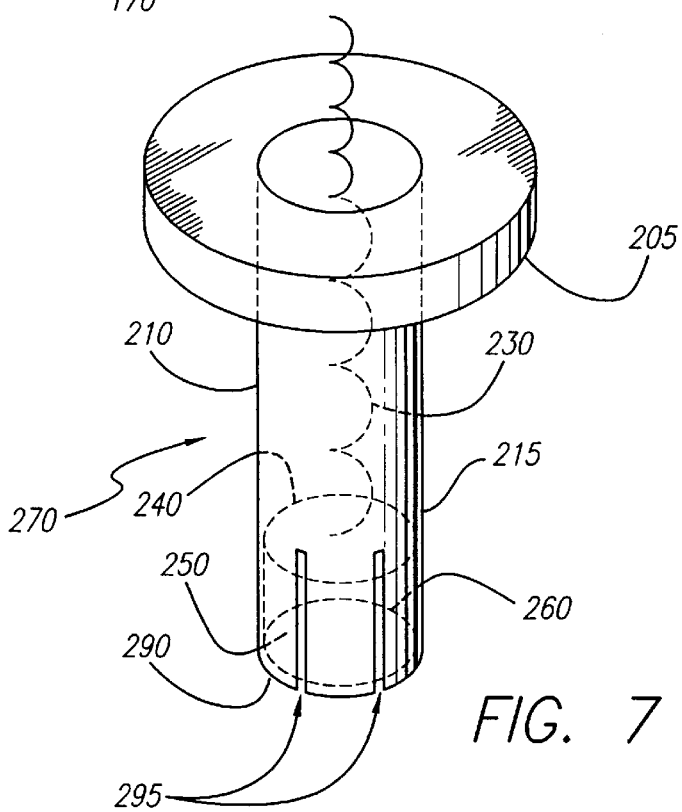
FIG. 7 illustrates an exploded front view of the first end of the connector assembly of a preferred embodiment of the present invention.

A portion of the inner end 215 of the first tube 270 is radially outwardly deflectable. Typically, the inner end 215 of the first tube 270 includes a number of openings or slits 295 (see FIG. 7) which allows the inner end 215 to move radially in an outward direction. Alternatively, the inner end 215 can be made of a flexible metal to provide for a more deflectable surface.

In a preferred embodiment, the biasing means includes a spring 230, a resilient or expandable material 250, and an assembly pin 207. Spring 230 is secured within first tube 270 at one end by side plate 184 and at the other end by a disk 240. Disk 240 can be made of any metal or plastic material. Positioned below disk 240 is resilient or expandable material 250. Resilient or expandable material 250 is typically made of rubber, foam or silicon. Positioned below resilient material 250 is a washer 260. Washer 260 is positioned on a lip 290 which is located at inner end 215 of first tube 270. Lip 290 prevents washer 260 from falling outside the first tube 270. Alternatively, the biasing means can be an inflatable device which can be expanded by injecting air into the inflatable device.

Assembly pin 207 is placed within inner surface 220 of the second tube 280 and into the first tube 270 and attached to disk 240. Typically, assembly pin 207 is a screw or a bolt having a threaded end which attaches to disk 240. Typically, the disk 240 has a hole contained therein for allowing the assembly pin 207 to screw into the disk 240. Spring 230 is placed in connector assembly 186 to hold the inner components in place during the assembly. Alternatively, the spring 230 can be any device that can be used to secure the inner components in place such as an inflatable device.

During the assembly, torque applied to the assembly pin 207 will exert a pressure on disk 240 and consequently on the inner end 215 of the first tube 270. Initially this force will adjust the connector assembly 186 and side plates 182, 184 to contract to the thickness of the wall. Once the connector assembly 186 reaches the thickness of the wall, two things may take place. First, the force may compress the rubber sealer 194 between outer ends 205, 235 and the wall 192 to provide a weather seal. Second, the force may compress the resilient or expandable material 250 and force to expand it radially. This outward force causes the inner end 215 of first tube 270 to open in an outward direction and as a result causes the outer surface 210 of first tube 270 to electrically and mechanically contact the inner surface 220 of second tube 280.

Connector assembly 186 is a structure that can be adjusted to different lengths while maintaining electrical conductivity between first tube 270 and second tube 280. Having the first tube 270 and the second tube 280 continually contact each other during movement of connector assembly 186, allows the grounding panel 180 to be used in situations where the wall 192 is of different thicknesses. Furthermore, having continual contact between the first tube 270 and the second tube 280 allows for electrical energy to be discharged from side plate 182 to ground 170 through connector assembly 186.

Figure 8:
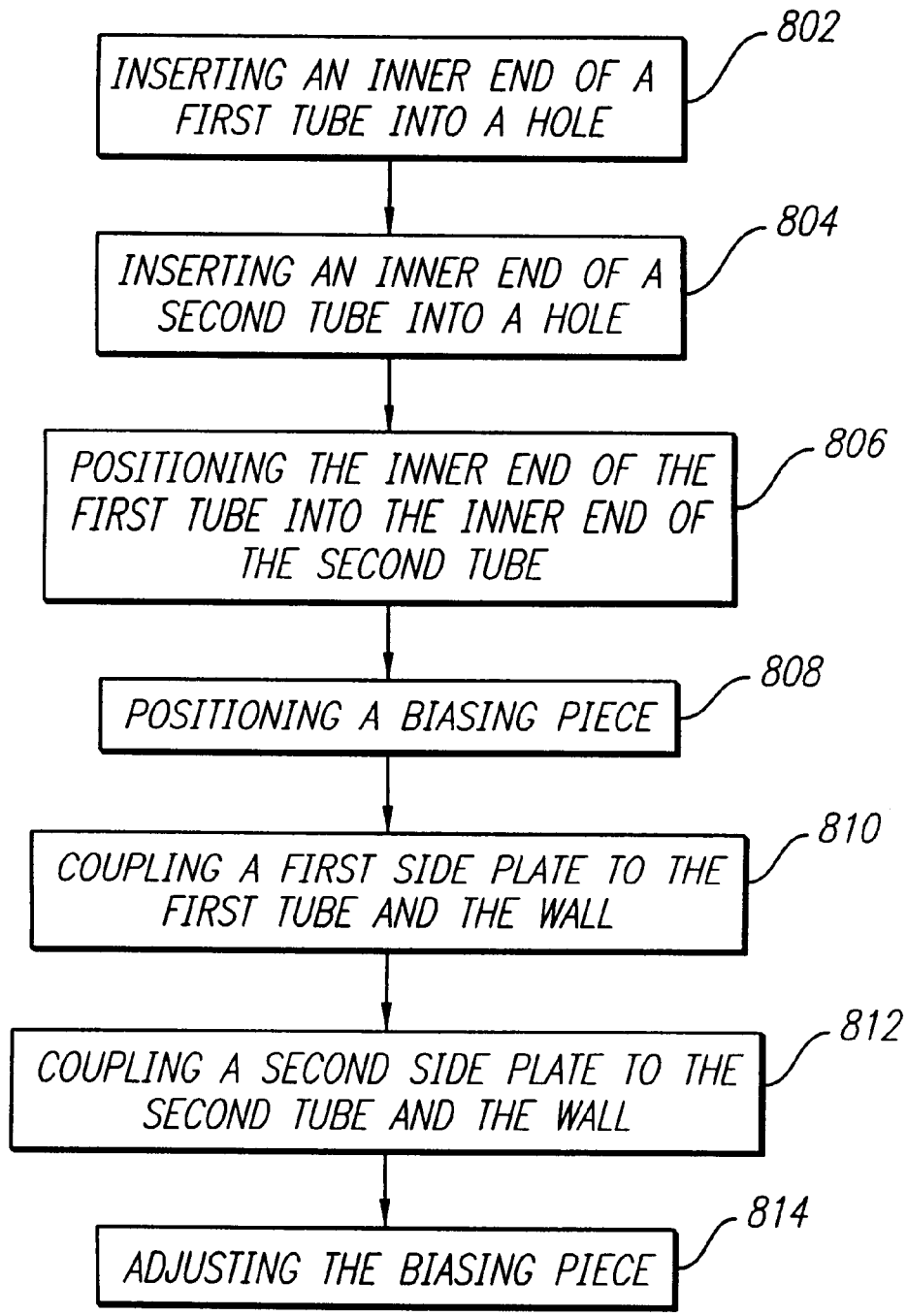
FIG. 8 illustrates a flow chart for installing the grounding panel of the present invention.

FIG. 8 illustrates a flow chart for installing the grounding panel of the present invention. The grounding panel is typically installed in a hole in a wall 192.

Generally a number of holes, i.e. 3, are positioned horizontally in the wall 192. The diameter of these holes are slightly larger than the diameter of second tube 280. At step 802, the inner end 215 of the first tube 270 is inserted into the hole. At step 804, the inner end 225 of the second tube 280 is inserted into the hole. At step 806, the inner end 215 of the first tube 270 is positioned into the inner end 225 of the second tube 280 so that the first tube 270 is slidably housed inside the second tube. At step 808, a biasing piece (as described above) is positioned inside a portion of the first tube. The biasing piece is used to radially outwardly deflect a portion of the inner end 215 of the first tube 270 so that the first tube 270 electrically and mechanically contacts the second tube 280. A first side plate 182 is coupled to the first tube 270 and the wall 192 at step 810. A second side plate 184 is coupled to the second tube 280 and the wall 192 at step 812. The biasing piece is adjusted to cause the portion of the inner end 215 of the first tube 270 to radially outwardly deflect at step 814. Step 814 might include applying torque or inflating the biasing piece, i.e., a tube.

Although the preferred embodiment is shown with a particular grounding panel, it is not required that the exact elements described above be used in the present invention. Thus, the connector assembly and the side plates are to illustrate one embodiment and not to limit the invention.

The invention has now been explained with reference to specific embodiments. Other embodiments will be apparent to one of ordinary skill in the art. It is therefore not intended that this invention be limited, except as indicated by the appended claims.

What is claimed is:

1. A surge device comprising:
    a panel for discharging electrical energy; and
    a connector assembly coupled to said panel, said connector assembly comprising:
        first and second telescoping tubes each having inner and outer ends, said inner end of said first tube slidably housed within said inner end of said second tube, said first tube having an outer surface and said second tube having an inner surface;
        a portion of said inner end of said first tube being radially outwardly deflectable; and
        a biasing piece for deflecting said portion outwardly so said outer surface of said first tube is biased against said inner surface of said second tube so to maintain electrical and mechanical contact between said first and second tubes over a range of relative telescopic positions of said first and second tubes.

2. A connector assembly comprising:
    first and second telescoping tubes each having inner and outer ends, said inner end of said first tube slidably housed within said inner end of said second tube, said first tube having an outer surface and said second tube having an inner surface;
    a portion of said inner end of said first tube being radially outwardly deflectable; and
    means for biasing said portion outwardly so said outer surface of said first tube is biased against said inner surface of said second tube so to maintain electrical contact for transferring electrical energy via said first and second telescoping tubes and mechanical contact between said first and second tubes over a range of relative telescopic positions of said first and second tubes.

3. The connector assembly of claim 2 wherein said biasing means comprises an assembly pin for radially outwardly deflecting said portion of said inner end of said first tube.

4. The connector assembly of claim 2 further comprising a second side plate coupled to said second tube.

5. The connector assembly of claim 2 further comprising a rubber sealer positioned concentric with said first tube.

6. The connector assembly of claim 2 further comprising a rubber sealer positioned concentric with said second tube.

7. The connector assembly of claim 2 further comprising a first side plate coupled to said first tube.

8. The connector assembly of claim 7 further comprising a grounding plate coupled to said first side plate.

9. The connector assembly of claim 2 wherein said biasing means comprises:

a disk positioned concentric with and within said portion of said inner end of said first tube; and an assembly pin positioned within said second tube and coupled to said disk for causing said disk to be displaced toward a lip located at said inner end of said first tube when a torque is applied to said assembly pin.

10. The connector assembly of claim 9 wherein said biasing means further comprises:

a spring positioned within said first tube and juxtaposed to said disk; and a resilient material positioned within said first tube at said inner end of said first tube and proximate to said disk.

11. The connector assembly of claim 10 wherein said resilient material is made from a material selected from a group consisting of rubber, foam and silicon.

12. A telecommunications system comprising:

communications equipment coupled to an antenna for receiving and transmitting signals;

a transmission line; and a surge suppression system for blocking excessive electrical energy developed at said antenna or on said transmission line during a surge condition, the surge suppression system comprising:

first and second telescoping tubes each having inner and outer ends configured to connect to said transmission line and said communications equipment;

a portion of said inner end of said first tube configured to be radially outwardly deflectable; and a biasing piece configured to bias said portion outwardly so an outer surface of said first tube is biased against an inner surface of said second tube so to maintain electrical contact between said first and second tubes over a range of relative telescopic positions of said first and second tubes;

said inner end of said first tube being configured to be slidably housed within said inner end of said second tube.

13. A method of installing a grounding panel in a hole in a wall comprising the steps of:

inserting an inner end of a first tube into said hole;

inserting an inner end of a second tube into said hole;

positioning said inner end of said first tube into said inner end of said second tube so that said first tube is slidably housed inside said second tube;

adjusting a biasing piece so that a portion of said inner end of said first tube is radially outwardly deflected so that said first tube electrically and mechanically contacts said second tube; and coupling an outer conductor of a transmission line to said first tube.

14. The method of claim 13 further comprising the step of coupling a first side plate to said first tube and said wall.

15. The method of claim 13 further comprising the step of coupling a second side plate to said second tube and said wall.

16. The method of claim 13 further comprising the step of positioning a rubber sealer concentric with said first tube.

17. The method of claim 13 further comprising the step of positioning a rubber sealer concentric with said second tube.

18. The method of claim 13 wherein said biasing piece includes an assembly pin and a disk disposed within said inner end of said first tube.

19. The method of claim 13 wherein said step of adjusting a biasing piece includes applying torque to said biasing piece.

20. The method of claim 13 wherein said step of adjusting a biasing piece includes inflating said biasing piece.

21. A connector assembly comprising:

first and second telescoping members each having inner and outer ends and having a low inductance for transferring electrical energy, said inner end of said first member housed within said inner end of said second member, said first member having an outer surface and said second member having an inner surface;

a portion of said inner end of said first member being outwardly deflectable; and a biasing piece for deflecting said portion outwardly so said outer surface of said first member is biased against said inner surface of said second member to maintain electrical contact between said first and second member over a range of relative telescopic positions of said first and second members.

* * * * *